(12) United States Patent
Kohlndorfer et al.

(10) Patent No.: US 7,240,924 B2
(45) Date of Patent: Jul. 10, 2007

(54) MULTILEVEL LOAD LIMITING RETRACTOR WITH DUAL SHIFTING MODE

(75) Inventors: Kenneth Kohlndorfer, Roseville, MI (US); Richard Koning, Yale, MI (US); Mark Gray, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 546 days.

(21) Appl. No.: 10/931,231

(22) Filed: Sep. 1, 2004

(65) Prior Publication Data

US 2006/0022447 A1   Feb. 2, 2006

Related U.S. Application Data

(60) Provisional application No. 60/592,154, filed on Jul. 29, 2004.

(51) Int. Cl.
*B60R 22/34* (2006.01)

(52) U.S. Cl. .................................................... 280/807

(58) Field of Classification Search ................ 280/807, 280/806; 297/476, 478, 479, 480
See application file for complete search history.

(56) References Cited

U.S. PATENT DOCUMENTS

| | | | |
|---|---|---|---|
| 1,335,807 A | 4/1920 | Hughes | |
| 3,857,528 A | 12/1974 | Fiala | |
| 3,952,967 A | 4/1976 | Barile et al. | |
| RE29,147 E | 3/1977 | Fiala | |
| 4,323,205 A | 4/1982 | Tsuge et al. | |
| 5,558,295 A | 9/1996 | Bauer | |
| 5,607,118 A | 3/1997 | Dybro et al. | |
| 5,611,498 A | 3/1997 | Miller, III et al. | |
| 5,613,647 A | 3/1997 | Dybro et al. | |
| 5,618,006 A | 4/1997 | Sayles | |
| 5,626,306 A | 5/1997 | Miller, III et al. | |
| 5,667,161 A | 9/1997 | Mitzkus et al. | |
| 5,671,894 A | 9/1997 | Dybro et al. | |
| 5,785,269 A | 7/1998 | Miller, III et al. | |
| 5,799,893 A | 9/1998 | Miller, III et al. | |
| 5,820,056 A | 10/1998 | Dybro et al. | |
| 5,823,570 A | 10/1998 | Lane, Jr. et al. | |
| 5,830,811 A | 11/1998 | Tang et al. | |
| 5,842,657 A | 12/1998 | Modzelewski | |
| 5,899,402 A | 5/1999 | Koning | |

(Continued)

FOREIGN PATENT DOCUMENTS

DE    7306883    5/1973

(Continued)

*Primary Examiner*—Faye M. Fleming
(74) *Attorney, Agent, or Firm*—Lonnie Drayer

(57) ABSTRACT

A seat belt retractor has a spool for seat belt protraction and retraction. An energy absorption mechanism is provided for absorbing energy from the spool during seat belt protraction. The energy absorption mechanism has a first part for a relatively high rate of energy absorption and a second part for a relatively low rate of energy absorption. A shift mechanism for shifting between the first part and the second part is also provided. The shift mechanism is a link movable between a first link position wherein the first part is engaged with the spool and a second link position wherein the second part is engaged with the spool. The link is drivable between the first link position and the second link position by energy from seat belt protraction.

20 Claims, 7 Drawing Sheets

U.S. PATENT DOCUMENTS

| | | |
|---|---|---|
| 5,904,371 A | 5/1999 | Koning |
| 5,924,641 A | 7/1999 | Keller et al. |
| 5,961,060 A | 10/1999 | Brambilla et al. |
| 5,967,441 A | 10/1999 | Kohlndorfer et al. |
| 6,206,315 B1 | 3/2001 | Wier |
| 6,228,488 B1 | 5/2001 | Tang et al. |
| 6,241,172 B1 | 6/2001 | Fugel et al. |
| 6,290,159 B1 | 9/2001 | Specht et al. |
| 6,312,806 B1 | 11/2001 | Tang et al. |
| 6,416,006 B1 | 7/2002 | Huber |
| 6,564,895 B1 | 5/2003 | Bohmler |
| 6,616,081 B1 | 9/2003 | Clute et al. |
| 6,648,260 B2 | 11/2003 | Webber et al. |
| 6,655,626 B2 | 12/2003 | Snyder |
| 6,685,124 B2 | 2/2004 | Frank |
| 6,834,822 B2 | 12/2004 | Koning et al. |
| 2001/0037907 A1 | 11/2001 | Peter et al. |
| 2003/0132334 A1 | 7/2003 | Koning et al. |

FOREIGN PATENT DOCUMENTS

| | | |
|---|---|---|
| DE | 27 27 470 A1 | 1/1979 |
| DE | 43 31 027 A1 | 3/1995 |
| DE | 44 36 810 A1 | 4/1996 |
| DE | 195 44 918 A1 | 6/1997 |
| DE | 195 46 731 A1 | 6/1997 |
| DE | 197 27 919 A1 | 11/1998 |
| DE | 199 27 731 A1 | 12/2000 |
| DE | 199 27 427 A1 | 1/2001 |
| DE | 200 19 468 U1 | 5/2001 |
| GB | 2 371 780 A | 8/2002 |

MULTILEVEL LOAD LIMITING RETRACTOR WITH DUAL SHIFTING MODE

This application claims priority to U.S. Provisional Application No. 60/592,154 which was filed on Jul. 29, 2004.

FIELD OF THE INVENTION

The present invention relates to a seat belt retractor assembly.

BACKGROUND OF THE INVENTION

A seat belt system for a vehicle typically has a seat belt retractor that serves to retract the belt into a housing. The belt is wound upon a spool in the housing. When the belt is drawn out or protracted, the spool winds a retraction spring, which later retracts the unused portion of the belt onto the spool or withdraws the belt into a housing when not in use.

In a crash the seat belt retractor has a lock that limits the extension of the seat belt from the housing. The lock may be actuated by an inertial sensor, which responds to changes in vehicle speed that occur during the crash. When a large deceleration is detected, the inertial sensor triggers the lock of the seat belt retractor to secure the seat belt in place during the crash.

In a locked condition, the belt restrains the vehicle occupant from moving forward during a crash. Although the seat belt has some give, the restraining force on the vehicle occupant can be significant. To reduce this force, manufacturers may use a torsion bar to absorb energy from the forward movement of the vehicle occupant in a controlled manner. Generally, the spool is mounted on the torsion bar, which is mechanically linked to the spool. During a crash, the torsion bar twists and deforms as the spool rotates from the protraction of the seat belt from the housing. The deformation of the torsion bar absorbs energy from the seat belt. Consequently, the vehicle occupant is gradually slowed rather than suddenly stopped during the crash.

The weight of the vehicle occupant can affect the rate by which the vehicle occupant is slowed by the restraining force of the seat belt. Heavier vehicle occupants require greater restraining force than lighter vehicle occupants. It is desirable to use a higher rate of energy absorption for a heavy vehicle occupant than for a light vehicle occupant.

Recently, manufacturers have commenced using seat belt retractors that absorb energy at different rates to accommodate differently weighing vehicle occupants. For example, when a small vehicle occupant is seated in the vehicle the seat belt retractor is set at a low rate of energy absorption. Thus, the lower weighing vehicle occupant is restrained with less restraining force than a heavier vehicle occupant. On the other hand, for a heavier vehicle occupant, a higher energy absorbing rate is used to slow the vehicle occupant using a greater restraining force. A vehicle occupant weighing somewhere in the middle may require a combination of restraining force rates during the course of the crash. Thus, a vehicle occupant may receive a restraining force that accommodates his weight.

There are incidents where a vehicle experiences more than one crash. It is generally desirable to continue to absorb energy at the same high rate for the heavy weight vehicle occupant in a second crash. However, for a lightweight occupant, it is preferable to absorb energy from the seat belt spool initially at a low rate for the first crash, then at the higher rate for the second crash. For a middleweight vehicle occupant, it is desirable to absorb energy at a high rate and then a low rate for the initial crash. For the second crash, a high rate of energy absorption is preferred. Conventional seat belt retractors do not have such a feature.

SUMMARY OF THE INVENTION

Like other seat belt retractors, a seat belt retractor according to the present invention has a spool for seat belt protraction and retraction as well as an energy absorbing mechanism to absorb energy from the spool during a crash. The energy absorbing mechanism has one part for absorbing energy at a high rate and another part for absorbing energy at a low rate. In contrast to conventional designs, however, the seat belt retractor of the present invention has a unique shift mechanism that allows the energy absorption mechanism to absorb energy at one level initially and then automatically at the other level in the event of a second crash. For a lightweight vehicle occupant the seat belt retractor may be set at a low rate of energy absorption for the initial crash. Following this crash the seat belt retractor shifts automatically to a high rate of energy absorption so that the seat belt retractor continues to absorb energy for a second crash at this higher level. For a middleweight vehicle occupant, the retractor initially absorbs energy at a high rate then switches to a low rate, and in the event of a second crash, switches back to a high rate. The present invention thereby ensures that the vehicle occupant is optimally restrained for both crashes.

As noted above, the energy absorbing mechanism may be one torsion bar capable of absorbing energy at a high rate and another torsion bar capable of absorbing energy at the low rate. The shift mechanism has a link that engages either one bar or the other to the spool. The link is drivable between a first link position in which the high rate part is engaged and a second link position in which the low rate part is engaged. The link may be driven by relative movement between the energy absorption mechanism and the spool, which is caused by the deformation of one of the torsion bars. The link may be a runner coupled to movement of the spool and may be received on a threaded member linked to move with the deforming torsion bar. Thus the seat belt retractor automatically moves between one bar and the other bar.

A seat belt retractor according to the present invention may incorporate a device for intelligently switching between the high rate of energy absorption and the low rate of energy absorption. In so doing, the seat belt retractor has two mechanisms for switching between energy absorption levels. This device may be a coupling device, which is controlled by a computer to couple either the high rate torsion bar to the spool or the low rate torsion bar. This coupling device may have a first coupling position in which the spool is engaged with the high rate bar and a second coupling position in which the low rate bar is engaged. The coupler may move between these positions in a direction generally along the axis of rotation of the spool.

The seat belt retractor may have a default position set at the high rate of energy absorption. For a heavyweight vehicle occupant, the retractor stays at this setting throughout the incident irrespective of the number of crashes. To accommodate a middleweight vehicle occupant, the energy absorbing mechanism may initially absorb energy at a relatively high rate, then, as controlled by the computer, switch to the low rate. Relative movement of the spool and the energy absorption mechanism then causes the link to move to a position for energy absorption at a high rate. For a lightweight vehicle occupant, the computer may set the seat belt retractor immediately to a low rate of energy absorption. As the energy absorption mechanism deforms and absorbs energy at this rate, relative movement of the energy absorption mechanism and spool automatically sets the seat belt retractor to absorb energy at a high rate in the event of a second crash. The retractor accommodates each body weight for both a single and multiple impact crash.

DETAILED DESCRIPTION OF THE INVENTION

Figure 1:
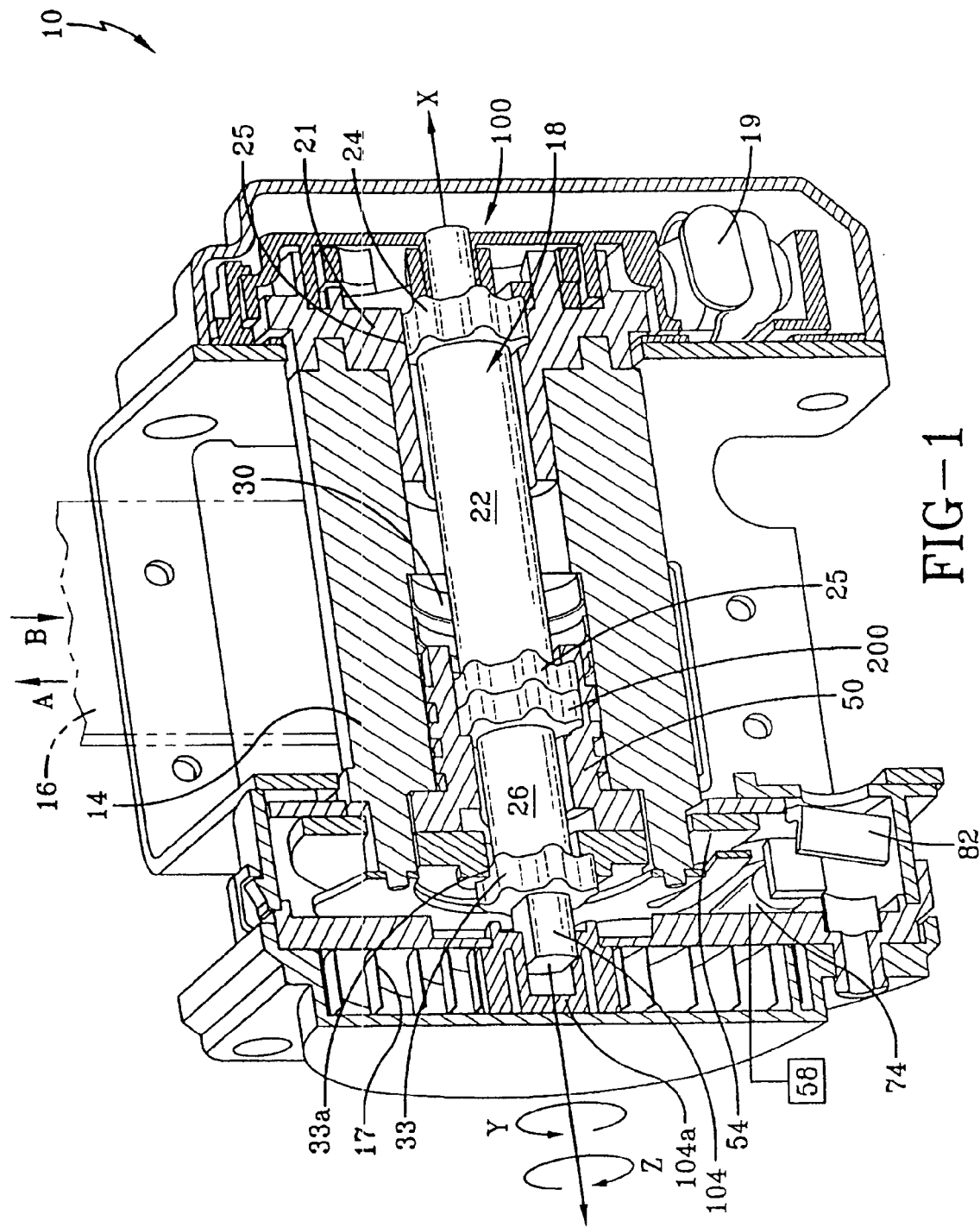
FIG. 1 is a perspective cross-sectional view of a seat belt retractor according to the present invention, including a spool, an energy absorption mechanism, and a shift mechanism.

FIG. 1 is a perspective cross-sectional view of a seat belt retractor 10. Like conventional seat belt retractors, a seat belt retractor 10 according to the present invention has a spool 14, upon which is wound a seat belt 16. As known, the seat belt retractor 10 allows the belt 16 to protract in the direction of arrow A and to retract in the direction of arrow B. When the seat belt 16 is protracted in the direction of arrow A, the spool 14 rotates in the direction of arrow Z due to a retraction spring 17 as known. The retraction spring 17 rewinds the unused portion of seat belt 16 in the direction of arrow B by the rotating spool 14 in the direction of arrow Y, opposite of the direction of arrow Z.

The seat belt retractor 10 has an inertial sensor 19, which detects changes in vehicle speed. In a crash the inertial sensor 19 actuates a pawl (not shown) that engages and locks a locking wheel 21 in place to limit protraction of the seat belt 16 in the direction of arrow A. To reduce the restraining force of the seat belt 16 on a vehicle occupant, the seat belt retractor 10 has an energy absorption mechanism 18 that absorbs energy from the protraction of the seat belt 16. The energy absorption mechanism 18 comprises at least one torsion bar mechanically linked to twist and deform with the spool 14. The energy absorption mechanism 18 has a first part 22, a torsion bar and a second part 26, another torsion bar. A single torsion bar may be employed as an energy absorption mechanism instead of two torsion bars. The first part 22 has a thicker diameter than the second part 26. Both the first and second parts 22, 26 are deformable. Twisting the first part 22 results in the absorption of energy at a relatively higher rate than twisting the second part 26, which absorbs energy at a relatively low rate, when the energy absorption mechanism 18 is comparably loaded.

The energy absorption mechanism 18 rotatably supports the spool 14. One end portion 100 of the energy absorption mechanism 18 has splines 24 that engage grooves 25 of the locking wheel 21 and is thereby rotationally locked in movement with the locking wheel 21. The other end 104 of the energy absorption mechanism 18 is rotationally locked in movement to a spring arbor 104a of retraction spring 17. A threaded member 50, a tube with threads on an exterior surface, is disposed around the energy absorption mechanism 18. The threaded member 50 has grooves 51 that engage the splines 24 of the first part 22 of the energy absorption mechanism 18 so that the threaded member 50 is rotationally locked in movement with the first part 22. The second part 26 also has splines 200 that engage grooves 51 in the threaded member 50 to rotationally lock in movement the splines 200 to the grooves 51.

Figure 7:
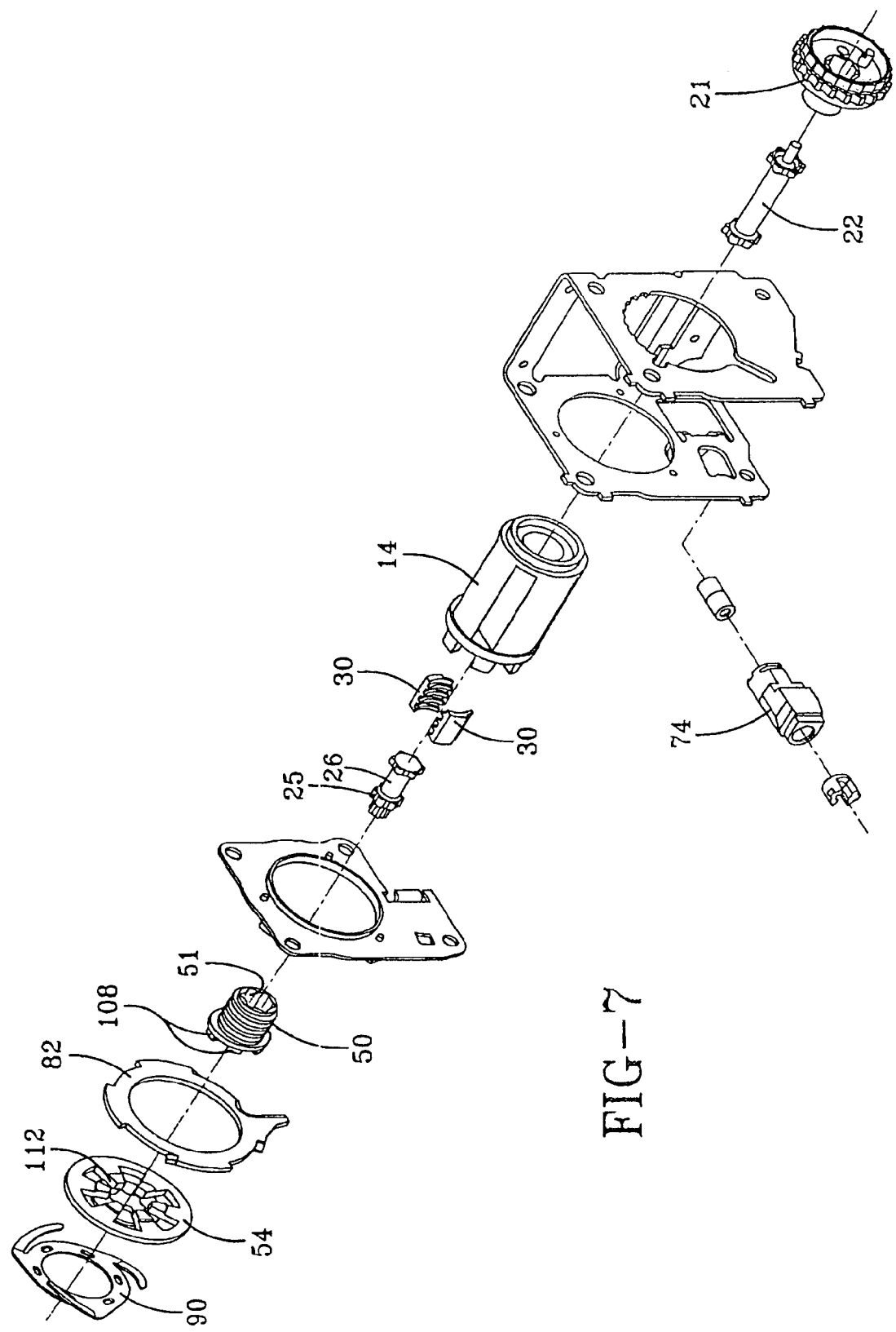
FIG. 7 is an exploded view of the seat belt retractor.

The energy absorption mechanism 18 also has splines 33 located near an end portion 104 of the second part 26. These splines 33 engage grooves 33a in a coupler 54 so that the second part 26 is rotationally locked in movement with the coupler 54. As shown in FIG. 7, the threaded member 50 has raised portions 108 that engage holes 112 in the coupler 54. Preferably, the fit between the holes 112 in the coupler 54 and the raised portions 108 of the threaded member 50 is tighter than the fit between the splines 33 of the second part 26 and the grooves 33a in the coupler 54. When the coupler 54 rotates, it will rotate the first part 22, rather than the second part 26 when the coupler 54 is engaged with the threaded member 50 even though the second part 26 is also engaged with the coupler 54.

Figure 2:
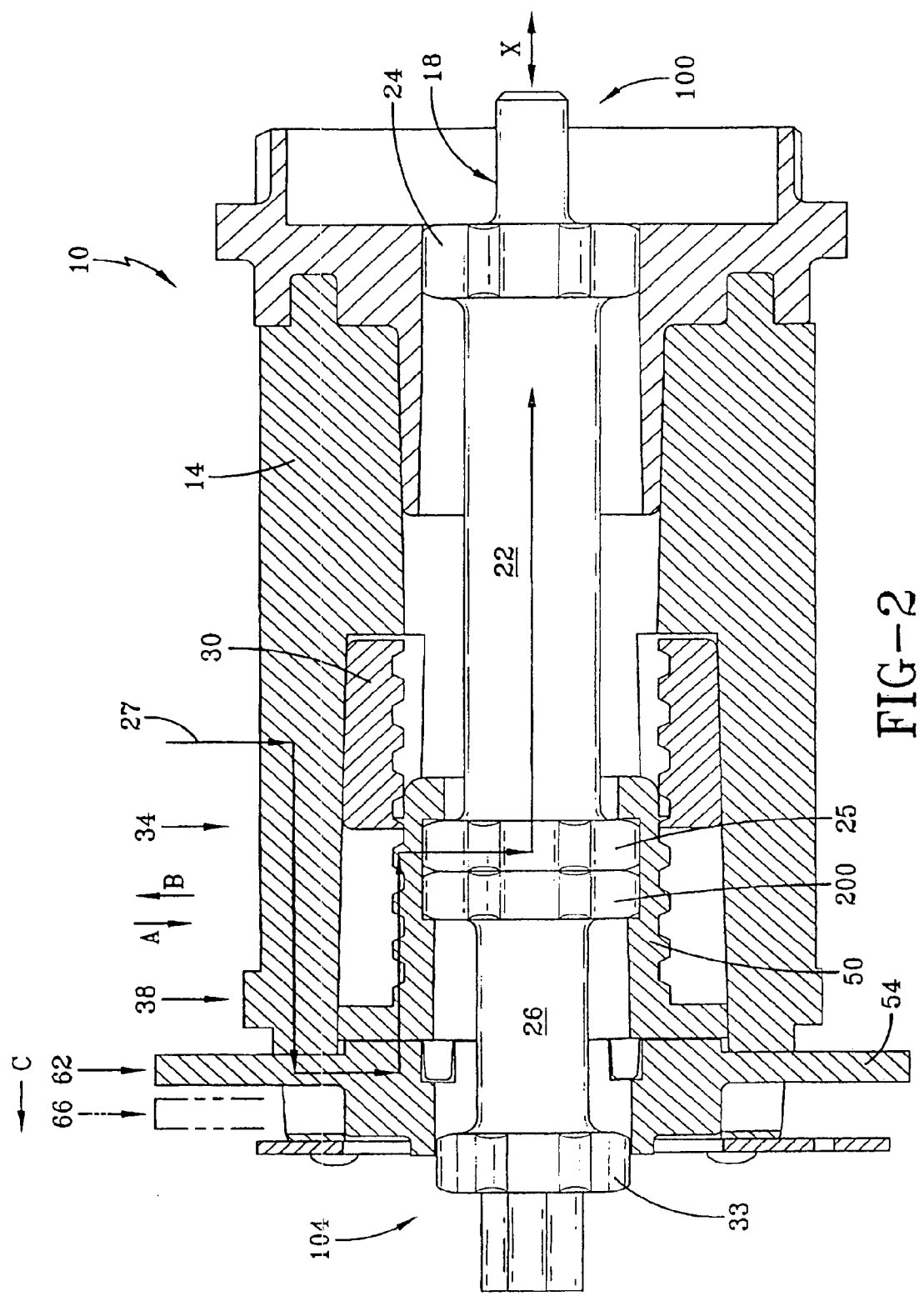
FIG. 2 is another view of the shift mechanism of FIG. 1, showing the energy absorption mechanism set at a high rate of energy absorption.

As shown in FIG. 2, during normal operation the spool 14 is rotationally locked in movement with an energy absorption mechanism 18 through the coupler 54, which, at this point, is engaged with the threaded member 50. The threaded member 50 is rotationally locked in movement with the first part 22 and the second part 26 of the energy absorption mechanism 18. When the locking wheel 21 is unlocked by the inertial sensor 19, rotation of the spool 14 causes energy absorption mechanism 18 to wind or unwind the retraction spring 17.

In a crash, through the coupler 54 the energy absorption mechanism 18 may be selectively actuated to absorb energy from the protraction of the seat belt 16 at two different rates as a function of torsion bar twist: a relatively high rate through the first part 22 and a relative low rate through the second part 26. However, unlike conventional designs, the seat belt retractor 10 has an additional mechanism, a shift mechanism 30 that selects the rate at which the energy absorption mechanism 18 absorbs energy. The seat belt retractor 10 has two features that control energy absorption thereby providing an additional level of control over the seat belt retractor 10 not found in other retractors.

The operation of a seat belt retractor according to the present invention during a crash will now be explained. Initially, the selection of the rate of energy absorption is made by the control of the positioning of the coupler 54 through a control unit 58, which determines the appropriate rate by sensing the size and weight of the vehicle occupant through known sensors and programming. Once the control unit 58 has made this determination, it controls the position of the coupler 54 based on this sensed data.

If a heavy vehicle occupant is sensed the control unit 58 maintains the seat belt retractor 10 in the position shown in FIG. 2. Here, coupler 54 is in a position to couple the spool 14 to the first part 22. When the inertial sensor 19 locks the locking wheel 21 in place during a crash, the end portion 100 of the first part 22 is prevented from rotating. Consequently, the withdrawal of the seat belt 16 in the direction of arrow A transmits a load along a load path 27, i.e., through the spool 14, coupler 54, threaded member 50, and first part 22. The end portion 100 is locked in place by the locking wheel 21 while, at the splines 25 the first part 22 will continue to rotate in the direction of arrow Z. Consequently, the first part 22 will twist and absorb energy by deforming. For a heavy vehicle occupant the energy absorption mechanism 18 absorbs energy from the spool 14 entirely through the first part 22 irrespective of the number of crashes. The first part 22 is sufficiently deformable to absorb energy for the anticipated number of crashes.

Figure 3:
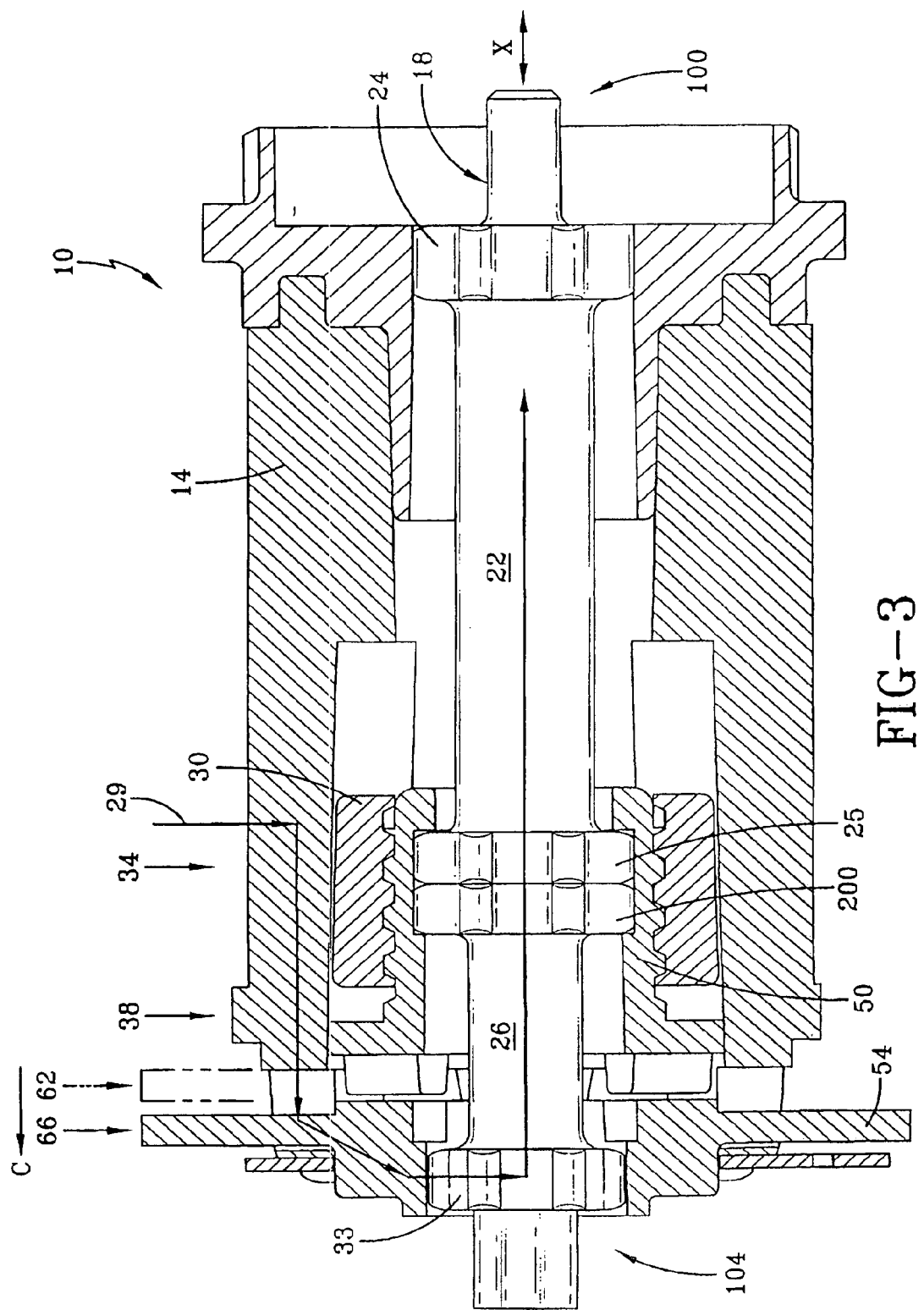
FIG. 3 illustrates seat belt retractor of FIGS. 1-2 with the energy absorption mechanism set at a relatively low rate of energy absorption.

If the control unit 58 determines that the vehicle occupant has a moderate weight, it is preferable to slow the acceleration of the vehicle occupant initially at a high rate than at a slow rate. The control unit 58 allows the spool 14 to deform the first part 22 for a predetermined number of turns or a predetermined amount of time and then moves the coupler 54 along an axis X in the direction of arrow C from a first position 62 shown in FIG. 2 to a second position 66 shown in FIG. 3. As shown in FIG. 3, the coupler 54 is decoupled from the threaded member 50 but still remains coupled to the spool 14 at the splines 33 of the second part 26. A load path 29 is then formed so that the load is then transmitted through the spool 14, coupler 54, and splines 33 to the second part 26 of the energy absorption mechanism 18. The second part 26 is locked at the splines 200 to the threaded member 50 and thereby to the first part 22. When the spool 14 rotates in the direction of arrow Z from seat belt protraction, the spool 14 causes the coupler 54 to the twist second part 26 prior to twisting the first part 22. This has the effect of causing energy from seat belt protraction to be absorbed at a lower rate by the second part 26.

For a lightweight vehicle occupant, it is preferable to absorb energy from seat belt protraction at a lower rate at the outset of the crash. The control unit 58 is programmed to the shift coupler 54 from a first position 62 to a second position 66 immediately so that the load is transmitted along a load path 29 at once as shown in FIG. 3. In this manner, energy is absorbed by the seat belt retractor 10 only at the lower rate.

Figure 5:
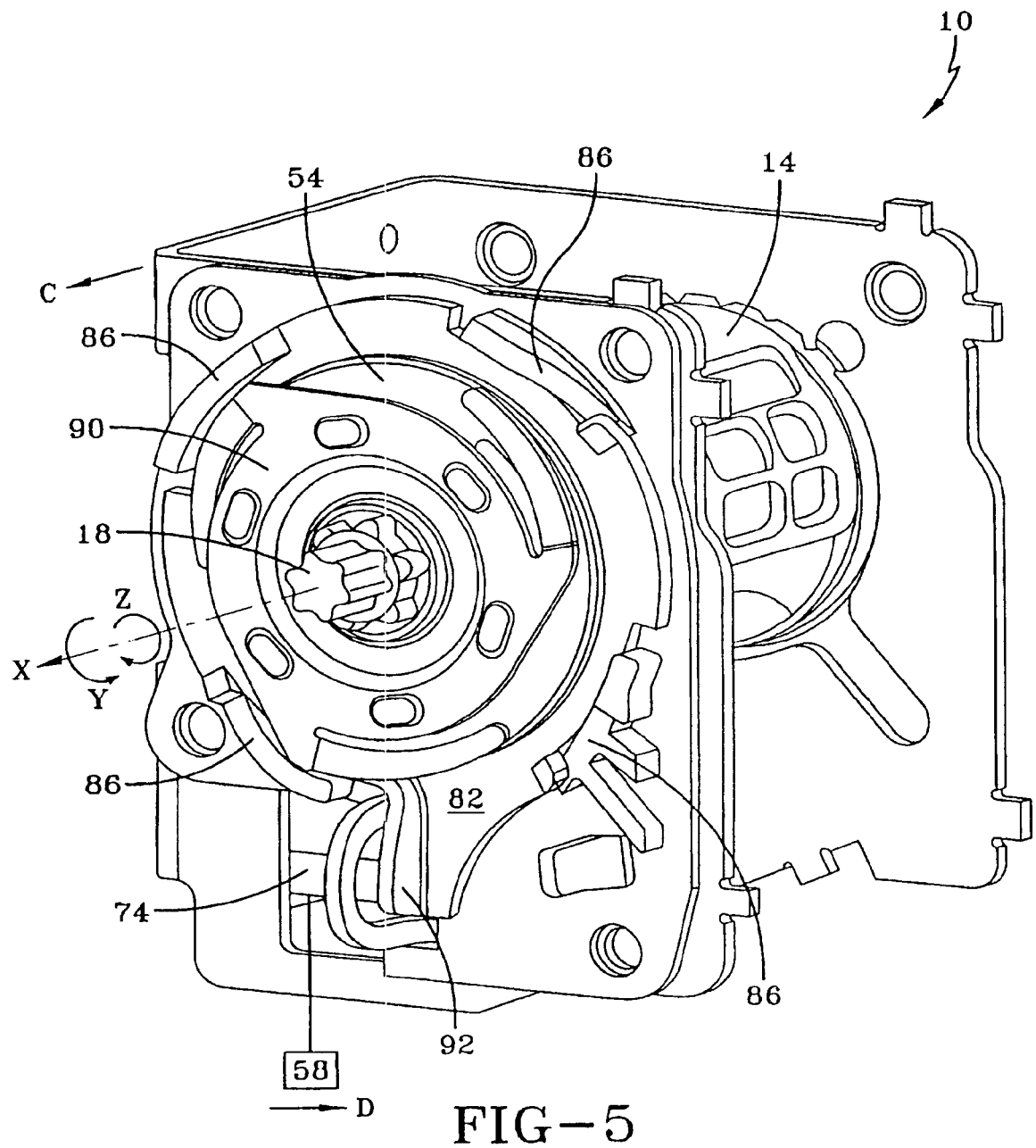
FIG. 5 is a perspective view of the seat belt retractor of FIGS. 1-4, showing the coupler in a position where the coupler has not yet been actuated.
Figure 6:
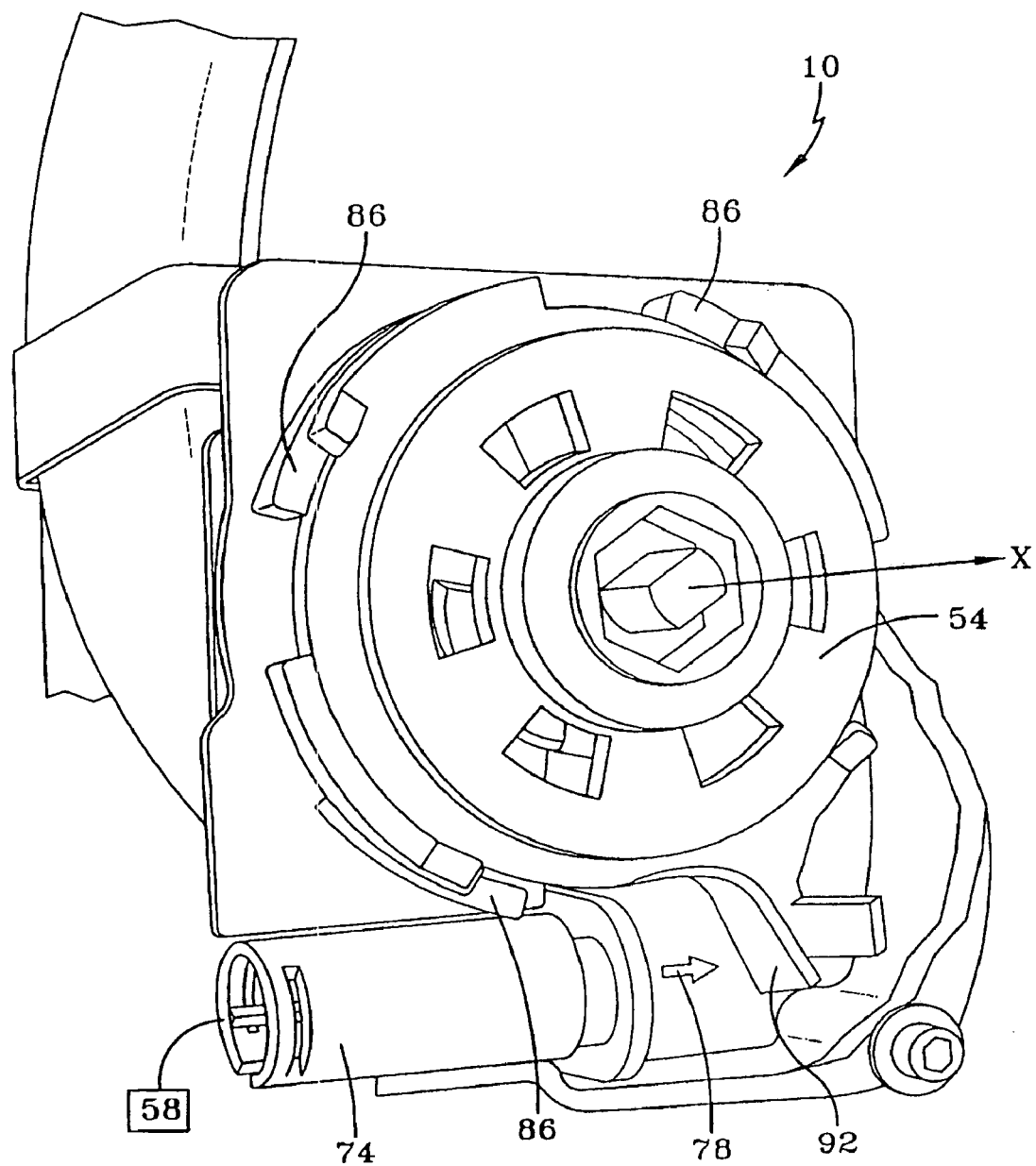
FIG. 6 illustrates the coupler of FIG. 5 in a position where the coupler has been actuated.

The actuation of the coupler 54 will now be explained with reference to FIGS. 5 and 6. The control unit 58 is in communication with the actuator 74, a pyrotechnic device which, when actuated, generates and propels gas in the direction of arrow D. the arrow D is transverse to the axis X. As shown in FIG. 6, this gas creates a force 78 on a wall 92 of a member 82. The member 82 then rotates about an axis X in the direction of arrow Y and rides up on a guide structure 86, such as ramps, causing the member 82 to move in the direction of arrow C. Movement of the member 82 causes likewise movement of the coupler 54 in the direction of arrow C. The member 82 will tend to slide down the guide structure 86 and separate from the coupler 54. Otherwise the coupler 54 and consequently the spool 14 will encounter resistance when the retraction spring 17 rewinds the spool 14. If the actuator 74 is not actuated, the coupler 54 and the member 82 are otherwise biased to be at the bottom of the guide structure 86 by the retaining spring 90.

The foregoing control of the absorption rate by control unit 58 is performed intelligently by known programming that analyzes the weight and size of the vehicle occupant. In addition, the seat belt retractor 10 has a shift mechanism 30 for shifting between the first part 22 and the second part 26. In contrast to the control unit 58, the shift mechanism 30 shifts the seat belt retractor 10 without reference to the weight or size of the vehicle occupant, thereby providing an added level of security to the seat belt retractor 10.

As shown in FIGS. 1-3, the energy absorption mechanism 18 is provided with a threaded member 50, which is linked in rotation with the first part 22 at the splines 25. When the coupler 54 is in a first position 62 for an event that requires a high rate of energy absorption (see FIG. 2), the coupler 54 engages the spool 14 to the threaded member 50 so that they both move rotationally together. When the spool 14 rotates along the direction of arrow Z as the seat belt 16 protracts, so too does the threaded member 50, which causes deformation of the first part 22 to absorb energy at a high rate. However, when the coupler 54 is in a second position 66, such as during a low loading event, the threaded member 50 is no longer rotationally linked to the spool 14 by the coupler 54. As a result, when the seat belt 16 protracts the spool 14 will rotate the second part 26 through the coupler 54, thereby twisting and deforming the second part 26. However, the threaded member 50 will remain relatively stationary. There will be relative rotational movement between the spool 14 and the threaded member 50.

Figure 4:
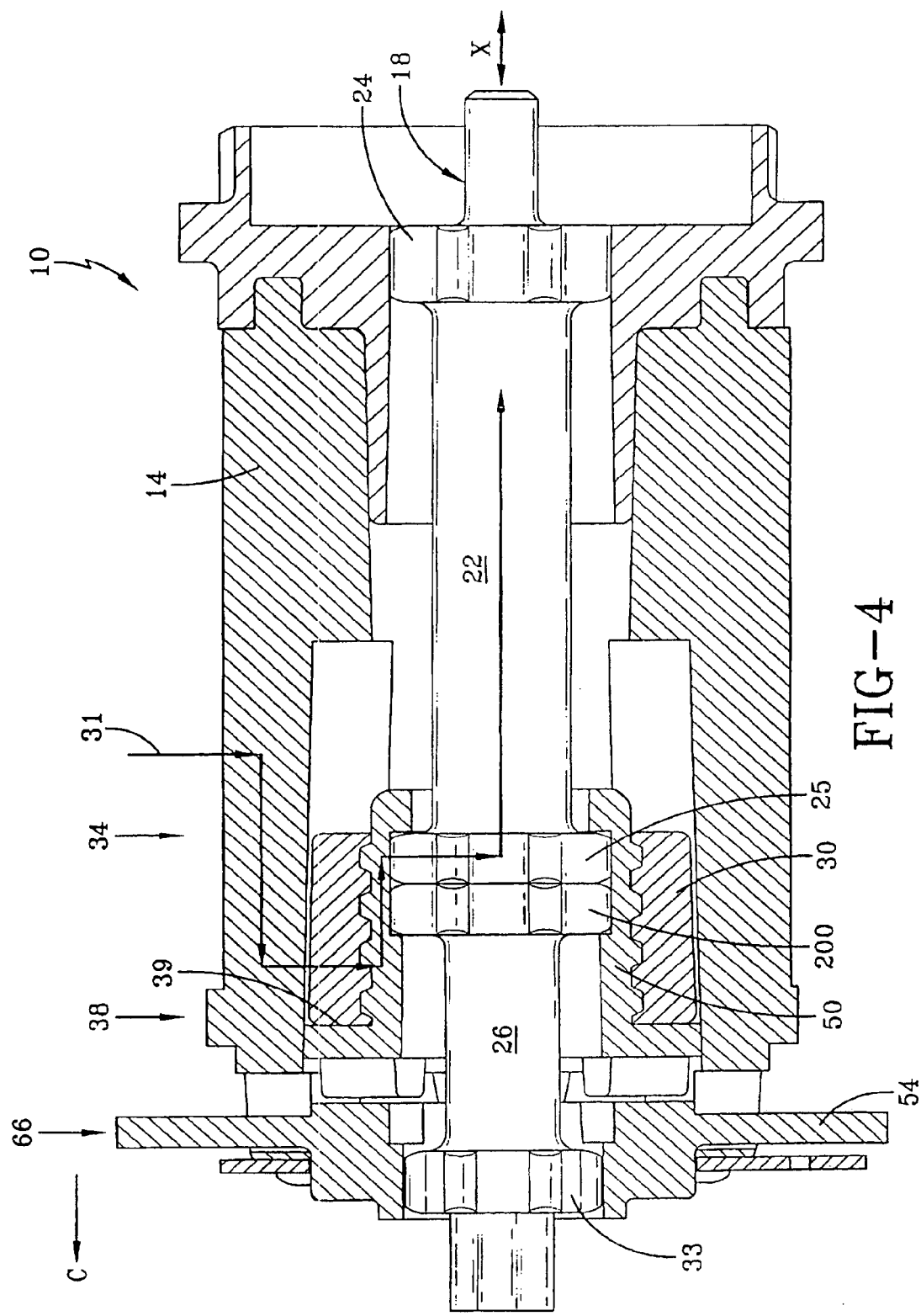
FIG. 4 illustrates the seat belt retractor of FIGS. 1-3, with the shift mechanism setting the energy absorption mechanism at a high rate of energy absorption.

Received on the threaded member 50 is a shift mechanism 30, such as threaded movable links or runners (see FIG. 7). One link or runner may also suffice. The shift mechanism 30 is linked in rotation with the spool 14. As shown in FIGS. 3 and 4, due to relative motion between the threaded member 50 and the spool 14, the shift mechanism 30 will rotate about the threads of the threaded member 50 to move axially in the direction of arrow C from a first link position 34 to a second link position 38. When the shift mechanism 30 has reached the second link position 38, the shift mechanism 30 will abut the end portion 39 of the threaded member 50. At this position, the shift mechanism 30 can no longer move in the direction of arrow C. The spool 14 and threaded member 50 will now be linked rotationally by the shift mechanism 30. As shown, the load from the seat belt protraction will then be transmitted along a load path 31 through the spool 14, shift mechanism 30, threaded member 50 and first part 22 of the energy absorption mechanism 18. The energy absorbing mechanism 18 will now absorb energy from the spool 14 at a higher rate than the second part 26.

The shift mechanism 30 thereby shifts automatically and mechanically the seat belt retractor 10 from a low rate to a high rate of energy absorption. When this shift occurs depends upon the number of turns the spool 14 is allowed to travel before the shift mechanism 30 abuts the end portion 39. The number of turns may be based on the anticipated location of the vehicle occupant following airbag deployment. If a second crash occurs the seat belt retractor 10 is automatically set to absorb a second impact at a high rate of energy absorption.

For a middleweight vehicle occupant, the control unit 58 allows the first part 22 to absorb energy from the spool 14 at a high rate, then shifts the coupler 54 from a first coupling position 62 to a second coupling position 66 to allow energy to be absorbed by the second part 26 at a low rate. Following a predetermined number of turns, the shift mechanism 30 then shifts back to the high rate of first part 22.

For a lightweight vehicle occupant, the control unit 58 shifts immediately to a low rate of energy absorption. After a predetermined number of turns, the shift mechanism 30 then shifts to the high rate of energy absorption. Thus, both the middleweight and the lightweight vehicle occupant are protected from a second crash.

The aforementioned description is exemplary rather than limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A seat belt retractor comprising:
   a spool for seat belt protraction and for seat belt retraction;
   an energy absorption mechanism for absorbing energy from the spool during seat belt protraction, the energy absorption mechanism having a first part for a relatively high rate of energy absorption and a second part for a relatively low rate of energy absorption; and
   a shift mechanism configured to shift between the first part and the second part, the shift mechanism comprising a link movable between a first link position wherein the first part is engaged with the spool and a second link position wherein the second part is engaged with the spool, the link drivable between the first link position and the second link position by energy from seat belt protraction.

2. The seat belt retractor of claim 1 wherein at least one of the first part and the second part comprises a torsion bar.

3. The seat belt retractor of claim 1 wherein the link is drivable between the first link position and the second link position by relative movement between the energy absorption mechanism and the spool.

4. The seat belt retractor of claim 3 wherein the link is drivable between the first link position and the second link position by deformation of the energy absorption mechanism.

5. The seat belt retractor of claim 3 wherein the link comprises a runner linked to move with the spool, wherein the runner is screwed on a threaded member linked to move with the energy absorption mechanism.

6. The seat belt retractor of claim 1 including a coupler for coupling one of the first part and the second part to the spool, the coupler communicating with a control unit for controlling the coupler.

7. The seat belt retractor of claim 6 wherein the coupler has a first coupling position wherein the first part is engaged with the spool and has a second coupling position wherein the second part is engaged with the spool, the coupler moving between the first coupling position and the second coupling position in a direction generally along an axis of rotation of the spool.

8. The seat belt retractor of claim 1 wherein the energy absorption mechanism is arranged to absorb energy from the spool at the relatively high rate following the relatively low rate.

9. The seat belt retractor of claim 8 wherein the energy absorption mechanism is arranged to absorb energy from the spool initially at the relatively high rate, then switches to the relatively low rate, and subsequently switches back to the relatively high rate.

10. A seat belt retractor comprising:
    a spool for seat belt protraction and seat belt retraction, the spool rotatable about an axis;
    an energy absorption mechanism extending along the axis and supporting the spool, the energy absorption mechanism having a first part for providing a relatively high force for resisting seat belt protraction and a second part for providing a relatively low force for resisting seat belt protraction to the spool; and
    a coupler for selectively engaging the first part and the second part to the spool, the coupler having a first coupling position wherein the first part is engaged with the spool and having a second coupling position wherein the second part is engaged with the spool, the coupler arranged to move between the first coupling position and the second coupling position in a direction generally along the axis.

11. The seat belt retractor of claim 10 including an actuator for moving the coupler between the first coupling position and the second coupling position.

12. The seat belt retractor of claim 11 wherein the actuator comprises a gas generator.

13. The seat belt retractor of claim 11 wherein the actuator is arranged to direct an actuation force in a direction transverse to the axis, the actuation force for moving the coupler between the first coupling position and the second coupling position.

14. The seat belt retractor of claim 13 including a member for redirecting the actuation force from the direction transverse to the axis to the direction generally along the axis.

15. The seat belt retractor of claim 14 including a guide structure for redirecting the member.

16. The seat belt retractor of claim 15 wherein the guide structure comprises a ramp.

17. A seat belt retractor comprising:
    a spool for seat belt protraction and for seat belt retraction;
    an energy absorption mechanism for absorbing energy from the spool during seat belt protraction, the energy absorption mechanism having a first part for a relatively high rate of energy absorption and a second part for a relatively low rate of energy absorption;
    a shift mechanism configured to shift between the first part and the second part, the shift mechanism comprising a link movable between a first link position wherein the first part is engaged with the spool and a second link position wherein the second part is engaged with the spool, the link drivable between the first link position and the second link position by energy from seat belt protraction; and
    a coupler for selectively coupling one of the first part and the second part to the spool, the coupler in communication with a control unit for controlling the coupler.

18. The seat belt retractor of claim 17 wherein the link is drivable between the first link position and the second link position by relative movement between the energy absorption mechanism and the spool.

19. The seat belt retractor of claim 17 wherein the energy absorption mechanism is arranged to absorb energy from the spool at the relatively high rate following the relatively low rate.

20. The seat belt retractor of claim 19 wherein the energy absorption mechanism is arranged to absorb energy from the spool initially at the relatively high rate, then switches to the relatively low rate through the control unit, and subsequently switches back to the relatively high rate through the shift mechanism.

* * * * *